United States Patent
Bhatia et al.

(10) Patent No.: US 8,971,849 B2
(45) Date of Patent: Mar. 3, 2015

(54) SYSTEM AND METHOD FOR NETWORK ASSISTED CONTROL AND MONETIZATION OF TETHERING TO MOBILE WIRELESS DEVICES

(75) Inventors: Sumeet Singh Bhatia, Hoffman Estates, IL (US); Mankesh Ahluwalia, Schaumburg, IL (US); Narothum Saxena, Hoffman Estates, IL (US); Michael Shannon Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 13/340,128

(22) Filed: Dec. 29, 2011

(65) Prior Publication Data

US 2013/0171964 A1    Jul. 4, 2013

(51) Int. Cl.
*H04M 3/16*    (2006.01)
(52) U.S. Cl.
USPC ........... 455/411; 455/557; 455/406; 455/559; 709/223; 709/224; 709/208; 370/389; 370/229; 370/230
(58) Field of Classification Search
CPC ..... H04L 69/163; H04L 69/16; H04L 69/161; H04L 63/166; H04L 63/168; H04L 67/2804; H04L 29/12066; H04L 61/1511; H04L 29/06; H04L 63/1458; H04L 12/2803; H04L 45/7453; H04L 49/10; H04L 49/30
USPC ............ 455/41.2, 426.2, 411, 406, 557, 559; 370/389, 230, 352, 229, 395.1, 402, 370/412; 709/223, 224, 228, 208
See application file for complete search history.

(56) References Cited

U.S. PATENT DOCUMENTS

| | | | |
|---|---|---|---|
| 7,239,862 B1 * | 7/2007 | Clare et al. ................... | 455/406 |
| 8,019,683 B1 * | 9/2011 | Swanburg et al. ............. | 705/40 |
| 2005/0030940 A1 * | 2/2005 | Abrol et al. .................. | 370/352 |
| 2008/0003981 A1 * | 1/2008 | Sharma et al. ............... | 455/411 |
| 2009/0279543 A1 * | 11/2009 | Strom et al. ................. | 370/389 |
| 2010/0034083 A1 * | 2/2010 | Prakash et al. ............. | 370/230.1 |
| 2011/0145445 A1 * | 6/2011 | Malamant et al. ............. | 710/16 |
| 2012/0143978 A1 * | 6/2012 | Coussemaeker et al. ..... | 709/208 |
| 2012/0264375 A1 * | 10/2012 | Shankaranarayanan ..... | 455/41.2 |

* cited by examiner

*Primary Examiner* — Mehmood B Khan
(74) *Attorney, Agent, or Firm* — Leydig, Voit & Mayer, Ltd.

(57) ABSTRACT

A way for managing use of a mobile wireless device in a tethering configuration is described. The disclosed mobile wireless system is configured to receive a message packet issued from a device tethered to the mobile wireless device. The system determines whether the mobile wireless device is permitted to pass messages on behalf of tethered devices by referencing a profile with which the mobile device is associated. The mobile wireless system discards the received message packet in response to determining from the profile that the mobile wireless device is not permitted to pass messages on behalf of tethered devices. Moreover, a number of ways for monetizing the supported tethering mode are described such that a service provider is adequately compensated for the increased demand on the mobile wireless network resources arising from support for the tethering mode of operation for a mobile wireless device.

19 Claims, 4 Drawing Sheets

| Subscriber_ID | Current Data Rate Plan | Monthly Recurring Charge | Bill Cycle Date | Total Monthly Accumulated Usage | Total Monthly Data Limit | Tethered Mode Monthly Accumulated Usage | Total Tethered Mode Monthly Data Limit |
|---|---|---|---|---|---|---|---|
| 150 | 152 | 154 | 156 | 158 | 160 | 162 | 164 |

FIG. 2

SYSTEM AND METHOD FOR NETWORK ASSISTED CONTROL AND MONETIZATION OF TETHERING TO MOBILE WIRELESS DEVICES

FIELD OF THE INVENTION

This invention relates generally to the field of wireless communications networks and associated services. More particularly, the invention is directed to wireless data communication services (such as those supporting data flows to/from smart phones) in such networks, and more specifically to managing wireless network data resource utilization on an individual user basis in accordance with subscriber agreements specifying limits on how mobile devices utilize provided data communications services. The invention also relates to communications accounting subsystems that specify additional charges for use of mobile devices, when the system detects operation of the mobile devices in a high data bandwidth usage mode, in accordance with the subscription agreements.

BACKGROUND OF THE INVENTION

Proliferation of smart phones, and their subsequent use to perform high data-rate communications, has resulted in an exponential growth in the volume of data flowing over wireless networks. The increased volume of data flowing over the networks is taxing the service providers and the network infrastructure responsible for ensuring the data flows at acceptable rates for most, if not all, users. If unchecked, a small population of users of the wireless networks, consumers of excessive portions of the available wireless network bandwidth, would degrade the quality of service for all users.

One form of potential abuse of wireless network services is excessive consumption of a wireless network's available bandwidth by using a mobile device as a wireless router for a set of other Internet-capable wireless devices, including: notebook computers, netbook computers, tablet PCs, etc. For instance, certain mobile operating systems, such as ANDROID, allow users to select an option to use a smart phone in a tethering mode. In the tethering mode the mobile device operates as a modem connecting a plurality of wireless data bandwidth consuming devices, such as laptops and tablets, to the Internet via the mobile device's data connection to a mobile (cellular) wireless data network.

Such usage pattern, if unchecked, potentially places a heavy load on existing mobile networks. As a consequence, mobile network operators are faced with exponential and highly variable network traffic requiring increased capital expenditures to deal with new peak usage levels induced by the aforementioned tethering mode.

SUMMARY OF THE INVENTION

Embodiments of the invention are used to provide a system and method that allow a network operator to permit usage of a mobile device in a tethering mode, for example when the mobile device is being used by one or more other devices (e.g., notebook, netbook, and tablet computers) as a wireless access point. Upon detecting use of the mobile device in the tethering mode, permitting the mobile device to operate in the tethering mode is based on a user profile and associated mobile communications service agreement. Moreover, in a particular example/application of the method and system where tethering is detected by the wireless hosting infrastructure, a billing and rating engine differentiates between normal use of the mobile device and use of the mobile device in the tethering configuration. The billing and rating engine records such use for processing by a subscriber account billing system in accordance with a tiered billing definition.

In one aspect of the invention, a method for managing use of a mobile wireless device in a tethering configuration is provided. The method includes receiving a message packet issued from a device tethered to the mobile wireless device. The method further includes determining, in response to the receiving step, whether the mobile wireless device is permitted to pass messages on behalf of tethered devices by referencing a profile with which the mobile device is associated. Moreover, the method includes discarding the message packet in response to determining from the profile that the mobile wireless device is not permitted to pass messages on behalf of tethered devices. The invention also comprises a non-transitory computer readable medium including computer executable instructions for carrying out the above-described steps.

The aforementioned method is carried out in various system configurations. In a first network arrangement a mobile wireless system is provided for managing use of mobile wireless devices in a tethering configuration. The system includes a mobile wireless device configured to support networking a set of tethered devices by routing messages between the set of devices and the mobile wireless system. The system further includes an access gateway configured to carry out the steps of: receiving a message packet from the mobile wireless device, the message packet having been issued from one of the set of tethered devices; determining, in response to the receiving step, whether the mobile wireless device is permitted to pass messages on behalf of tethered devices by referencing a profile with which the mobile device is associated; and discarding the message packet in response to determining from the profile that the mobile wireless device is not permitted to pass messages on behalf of tethered devices.

The aforementioned method is also carried out in a second network arrangement wherein a mobile wireless system is provided for managing use of mobile wireless devices in a tethering configuration. The mobile wireless system includes a mobile wireless device configured to support networking a set of tethered devices by routing messages between the set of devices and the mobile wireless system. The mobile wireless device is further configured to perform the steps of: receiving a message packet, the message packet having been issued from one of the set of tethered devices, and coloring the message packet to indicate that the message packet issued from one of the set of tethered devices. The mobile wireless system further includes an access gateway configured to perform the steps of: receiving the message packet from the mobile wireless device, determining, in response to receiving the message packet from the mobile wireless device, whether the mobile wireless device is permitted to pass messages on behalf of tethered devices by referencing a profile with which the mobile device is associated, and discarding the message packet in response to determining from the profile that the mobile wireless device is not permitted to pass messages on behalf of tethered devices.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 is a portion of an exemplary subscriber record including fields relating to a subscriber agreement consulted by the system for managing operation of connected mobile devices capable of operating in a tethering mode;

DETAILED DESCRIPTION OF THE DRAWINGS

The provided figures and associated written description herein provide illustrative examples of a system and method for detecting operation of a mobile device in a tethering mode that can potentially lead to excessive data bandwidth consumption by the mobile device. Moreover, the exemplary system and method incorporates billing and rating functionality that appropriately charges and/or bills subscriber accounts for operating in the tethering mode.

Figure 1:
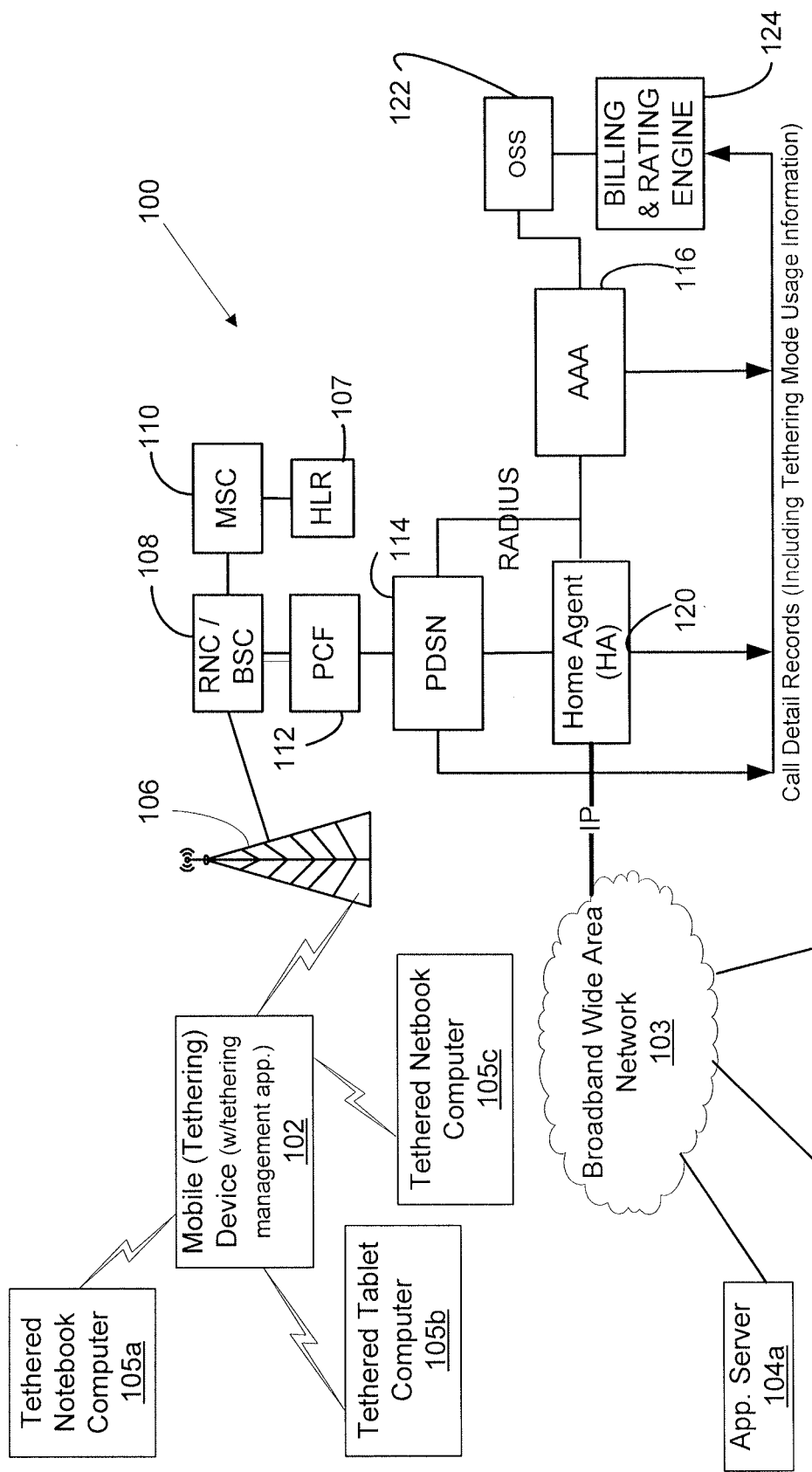
FIG. 1 is a schematic diagram illustrating a mobile environment interfacing a broadband digital data network to which a variety of application servers are coupled and are accessed by a set of tethered wireless devices via a mobile device operating in a tethering mode in accordance with an embodiment of the invention.

Turning to FIG. 1, a network environment is schematically depicted that includes monitoring and management components facilitating the aforementioned tethering mode detection, maintenance and billing functions. The illustrative embodiment includes a mobile wireless network system 100 that incorporates, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of WCDMA, UMTS, GSM, GPRS, EDGE, Wi-Fi (i.e., IEEE 802.11x), Wi-MAX (i.e., IEEE 802.16), or similar telecommunication standards configured to deliver data services to a mobile device 102. There is no intention to limit the invention to such environment since the tethering mode management scheme applies to other mobile wireless environments including, without limitation, LTE based mobile wireless network systems.

In the illustrative example, a mobile wireless network system 100 provides mobile wireless data network services via a base station 106 to the mobile device 102. Embodiments of the mobile device 102 include a mobile phone, a PDA, or a mobile computer (e.g., a laptop) having mobile wireless capability.

The mobile wireless system 100 includes a plurality of base stations, such the base station 106. The base station 106, by way of example, includes radio bearer resources and other transmission equipment necessary for wireless communication of information between the mobile device 102 and other network elements.

The mobile device 102 is any of a variety of devices including, for example: a mobile phone, a PDA, or a mobile computer (e.g., a laptop, notebook, notepad, tablet, etc.) having mobile wireless data communication capability. The mobile device 102 is capable of operating in a "tethering mode" wherein the mobile device 102 operates as a wireless router for tethered devices (e.g., tethered notebook 105*a*, tethered table compute 105*b* and tethered netbook computer 105*c*). In the tethering mode, data is received from an external interface of the mobile device such as, for example, a wirelessly (e.g., Bluetooth) connected device via a radio interface on the mobile device 102. The received data is routed by the mobile device 102 via a mobile wireless connection between the mobile device and a base station 106 of the mobile wireless system 100. The mobile device 102 routes responsive data from the base station 106 to tethered devices. The mobile device 102, in illustrative embodiments, runs the ANDROID operating system that supports the aforementioned tethering mode. The ANDROID operating system includes components that specifically support the tethering mode.

The mobile wireless network system 100 is, in turn, connected to a broadband wide area network 103. The broadband network 103 provides digital data connectivity to a variety of application servers 104*a*, 104*b*, and 104*c*. The application servers 104*a*, 104*b*, and 104*c* are representative of millions of application server systems providing a variety of Web-based services via the Internet.

Turning attention to particular components of the mobile wireless system 100, a home location register (HLR) 107 provides services for authenticating an identity of the mobile device 102 prior to permitting access to radio access network resources of the mobile wireless system 100. The HLR 107, by way of example, maintains a database of subscribers to the mobile wireless system 100. Each individual subscriber (e.g., each distinctly identified mobile device) entry includes a Mobile Identification Number (MIN) and/or Electronic Serial Number (ESN).

Moreover, for each data access network, radio access network resources are used to control the radio interface aspect of the mobile wireless system 100 that includes the plurality of base stations. Control of the radio interface of the system 100 is carried out, for example, by a radio network controller (RNC) or a base station controller (BSC), identified in FIG. 1 as RNC/BSC 108. The RNC/BSC 108 manages the radio traffic between a plurality of base stations such as the base station 106. Such management of radio traffic includes controlling handoff between sectors and/or base stations.

Additionally, the mobile wireless system 100 illustratively depicted in FIG. 1 includes a mobile switching center (MSC) 110. The MSC 110 manages voice calls placed in and out of the mobile wireless system 100.

Continuing with the illustrative schematic depiction of the wireless network 100, a packet control function (PCF) 112 is communicatively coupled to the RNC/BSC 108. The PCF 112 carries out the function of routing data packets from the RNC/BSC 108 to one of a set of PDSNs. The RNC/BSC 108 is, by way of example, collocated with a packet control function (PCF) 112. It is noted that in the illustrative example, the system 100 is depicted as having a single packet data serving node (PDSN)—i.e., PDSN 114, and in such instance the PCF 112 is not needed to perform the aforementioned routing to a particular one of multiple PDSNs. However, in cases where a wireless system comprises multiple PDSNs, the PCF 112 selectively routes data packets received from the RNC/BSC 108 to an appropriate one of the set of PDSNs for further processing.

The illustrative mobile wireless system 100 includes one or more services (implemented in the form of computer executable instructions carried out by processors on one or more physical server machines) that authenticate and determine/designate access rights for particular identified entities prior to granting access to the mobile wireless system 100's data network transmission services. In the exemplary embodiment, such authentication services are provided by an accounting authentication authorization (AAA) service 116.

The AAA service 116 carries out the task, during set up of a session for an identified subscriber, of ensuring that the subscriber associated with the mobile device 102 is allowed to use the data resources of the system 100. After initially confirming the authenticity of the identified user seeking to establish a user session, the AAA service 116 provides a response including a profile for the identified user including, among other things, user permissions. The permissions can be implicit—e.g., the user is identified as belonging to a particular group—or explicitly listed in the profile assigned to the system. In the illustrative example, the AAA service 116 includes a field specifying whether a mobile device, such as the mobile device 102 is permitted to tether other connected devices (i.e., operate in the tethering mode).

In the exemplary system, where tethering mode operation of mobile devices is monitored and limited, the AAA service 116 specifies a profile to the PDSN 114, during start up of a session between the mobile device 102 and the mobile wireless system 100, that identifies whether the mobile device 102 is permitted to operate in a tethering mode.

Upon completion of the user authorization process for the use of data resources, via the PDSN 114 and AAA service 116, a home agent (HA) 120 forwards an IP address, received from the AAA server 116, to the PDSN 114. The PDSN 114, in turn, forwards the IP address to the mobile device 102. In the illustrative example, the HA 120 is a router located on a home network of the mobile device 102. The HA 120 tunnels packets from the home network to the mobile device 102 when the mobile device 102 is roaming.

An Operating Support System (OSS) 122 serves as a central point for administration, management, and provisioning of all network elements. Among other things, the OSS 122 administers the individual accounts of subscribers that use the mobile wireless system 100—including specifying the profile values that determine whether users associated with the account with which the mobile device 102 is associated, are permitted to operate in the "tethering mode."

In accordance with an exemplary embodiment, the mobile wireless system 100 further includes a billing and rating engine 124. As indicated in FIG. 1, the billing and rating engine 124 is a back office system that is configured to receive certain information, based upon subscriber usage information (including whether the mobile device 102 is routing packets on behalf of tethered devices) received from other components of the system 100. The billing and rating engine 124 communicates such information to the OSS 122. By way of example, the billing and rating engine 124 monitors information provided by the HA 120 indicating that the mobile device 102 is (or has been) operating in the tethering mode—as well as the quantity of data passed by the mobile device 102 while operating the tethering mode). The billing and rating engine 124 issues a notification to the OSS 122 that the mobile device 102 is (or has been) operating in the tethering mode. The notification to the OSS 122, if not permitted under the current user profile for the mobile device 102, initiates immediate and/or delayed responsive actions by the mobile wireless system 100 to ensure that the mobile device 102 operates in accordance with the terms of a current user agreement and/or takes steps to change the subscriber agreement such that mobile device is permitted to operate in the tethering mode during future sessions.

Various embodiments of the above-described mobile wireless system 100 support differing ways to detect and respond to detection of the mobile device 102 routing packets on behalf of tethered devices (i.e., operating in the tethering mode). In accordance with a first set of exemplary embodiments (described with reference to FIG. 3), tethering mode is detected by components of the mobile wireless system 100 such as, for example, the home agent 120 or the PDSN 114. In accordance with a second set of exemplary systems (described with reference to FIG. 4), tethering mode is detected by a component (e.g., application) executing on the mobile device 102. Once tethering mode is detected, the detection of such mode of the mobile device 102 is monetized in any of a variety of ways in accordance with various usage monetization schemes. The exemplary schemes are facilitated by the ability of the mobile wireless system 100 (with possible aid from the mobile device 102) to detect (differentiate) when the mobile device is routing packets of data on behalf of a tethered device while operating in the tethering mode and thereafter map responsive data packet flow downstream from, for example, the application servers 104a, 104b, 104c.

In a first monetization arrangement, users pay a flat (monthly) fee for permission to send an unlimited quantity of data while operating in the tethering mode. In such case, the system need only verify that a particular session is authorized to operate in a tethering mode and thereafter allow all packets to pass without inspection. In a second monetization arrangement, users pay a monthly fee (e.g., $30) for permission to pass data packets while operating in the tethering mode up to a set amount (e.g., 3 GB). Thereafter, additional fees (e.g., $10) are charged for each addition amount (e.g., 1 GB). In this arrangement, each packet in each session is inspected to distinguish between packets originating from the mobile device 102 and devices tethered to the mobile device 102. A lower fee is charged for data passed in the non-tethering mode in the second monetization arrangement. A third monetization scheme (incorporated into the flowcharts depicted in FIG. 3 and FIG. 4) involves permitting usage of the mobile device 102 in the tethering mode up to a limited quantity (e.g., 5 GB per month for $30). The third scheme differs from the second monetization scheme in the situation where a particular account has met its monthly usage limit. In accordance with the third scheme, all data packets passed in association with the tethering mode are discarded by either the wireless system 100 or the mobile device 102—depending on whether the mobile device is capable of such detection. A fourth monetization scheme includes an additional feature of taking into consideration the time of day when the mobile device 102 is detected to be operating in the tethering mode. For example, operating in the tethering during night time (e.g., 1-6 am), when there is less data activity, is either not subject to a limit (or even free). However, operating in tethering mode during the day is limited (e.g., charging according to a usage agreement capping data usage per month). In yet another variation within the fourth monetization scheme, users are charged a lower flat fee for tethering mode usage during a low usage time period (e.g., 1-6 am) and a higher flat fee for operating in the tethering mode during periods of higher data traffic rates on the mobile wireless network. In yet another exemplary monetization scheme, only total data usage is monitored up to the point where a total usage meets a set monthly amount (e.g., 10 GB per month). Thereafter, the mobile device is permitted to pass data packets in the non-tethering mode, but packets transferred on behalf of tethered devices (while operating in the tethering mode) are discarded. Having described several monetization schemes, each dependent on the ability to detect transfer of data packets by the mobile device 102 while operating in a tethering mode, it is noted that the above examples are intended to be illustrative of the breath of potential types of monetization schemes facilitated by such detection of usage by the mobile device 102 of the tethering mode of operation to connect tethered devices to the mobile wireless system 100.

As one will readily observe from the above examples, a variety ways are potentially used to detect and monetize usage of the mobile device 102 in the tethering mode. The proposed detecting infrastructure (mobile device 102) and mobile wireless system 100) provides multiple points at which the tethering mode operation of the mobile device 102 is detected. Moreover, a variety of responses are potentially used when tethering mode operation of the mobile device 102 is detected. In particular, detection of the mobile device 102 operating in the tethering mode does not necessarily result in the mobile wireless system 100 terminating a current session or even detecting packets passed in the tethering mode operation of mobile device 102. For example, in one example, the subscriber is permitted to operate in the tethering mode for the remainder of the current session (with a possible "grace period" limit placed on even that session before the violating session is terminated by the system 100).

As those of ordinary skill in the art will realize, the foregoing network elements of the mobile wireless system 100 are implemented via telecommunications equipment having one or more computer processors, as well as non-transitory computer readable media, such as RAM/ROM, solid-state memory, and/or hard drive memory and the like, which store computer executable instructions for executing embodiments of the methods described in further detail below with reference to FIGS. 3 and 4.

Turning to FIG. 2, an exemplary set of fields for a data structure are provided that support management, by the billing and rating engine 124 and/or the OSS 122, of subscriber status with regard to permission for the mobile device 102 to operate (e.g., pass packets over the mobile wireless network 100 on behalf of wireless locally connected device) in the tethering mode. A subscriber_ID field 150 is a unique value assigned to a particular subscriber (e.g., the identification assigned to the mobile device 102). In the context of the mobile device tethering mode management scheme described herein, the subscriber_150 is the identification assigned to a particular subscriber account (that may comprise multiple linked mobile devices—such as multiple devices linked to a single account under a "family plan" wireless service subscription).

A current data rate plan field 152 identifies one of multiple plans supported by the wireless system 100. An element of the plan of specific interest, to the billing and rating engine 124, for purposes of discarding packets transferred by the mobile device 102 operating in the tethering mode is a monthly allocated tethered data usage limit (e.g., 2 gigabytes of data per month) for the subscriber. The data limit, extracted from terms of the identified plan, is stored in a monthly tethered data limit field 164. For example, if the allocated tethered data usage limit is set to 2 gigabytes of data per month, then packets transferred while the mobile device 102 operates in the tethered mode are discarded, once accumulated tethered data usage specified in a tethered mode monthly accumulated usage field 162 exceeds the limit specified in the monthly tethered data limit field 164.

A monthly recurring charge field 154 stores an amount charged to the wireless customer on a monthly basis for data usage under the plan specified in the current data rate plan field 152. A bill cycle date field 156 specifies the date of the month in which a subscriber's accumulated data usages, stored in a monthly accumulated usage field 158 (total data) and the tethered mode monthly accumulated usage field 162, are reset.

A total monthly data limit field 160 stores a value indicating the total number of bytes that can be transferred by the subscriber (including tethered and non-tethered modes) before administrative action is taken by the mobile wireless system. A total monthly accumulated usage by the subscriber is stored in the total monthly accumulated usage field 158.

Thus, the illustrative system includes a distinct data usage (e.g., data bytes transferred) accumulator (field 162) for measuring data usage by the mobile device 102 (associated with the subscriber account) operating in the tethering mode—as opposed to total data usage that is accumulated in the total monthly accumulated usage field 158. In the illustrative example, a current usage value counts upward toward a specified limit. However, an alternative, that avoids repeated accessing the monthly data limit fields 160 (total data) and 164 (tethered data), is to reset a counter to the monthly data limit every month and subtract from that stored value (i.e., "data usage remaining") until the value reaches zero to signal initiation of administrative actions relating to a subscriber exceeding a data plan limit.

Figure 3:
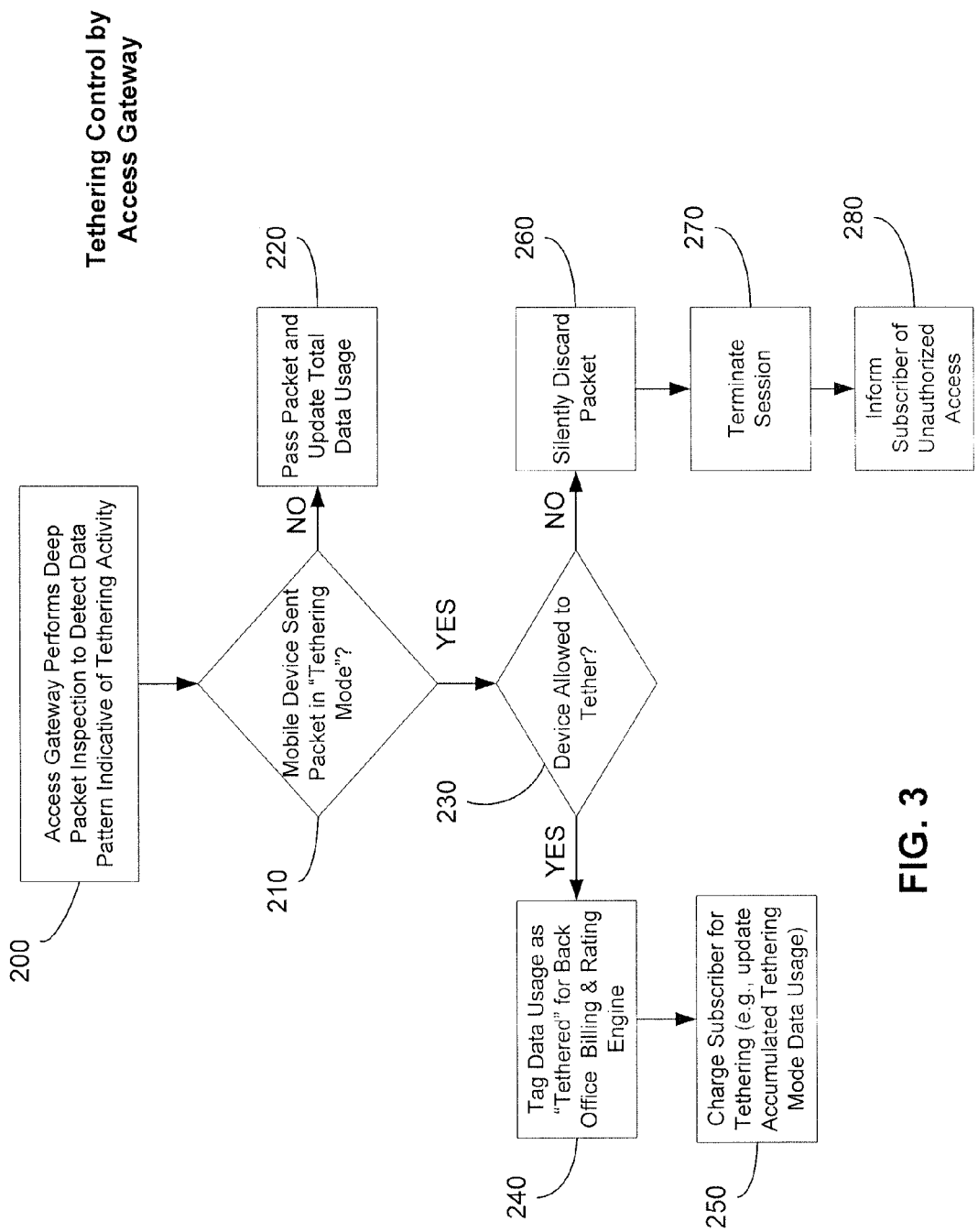
FIG. 3 is a schematic diagram illustrating a flow chart in accordance with an embodiment of the invention.

Turning to FIG. 3, a set of steps are summarized for limiting use of mobile devices in a tethering mode, and for billing/charging associated subscriber accounts according to a tiered subscription that distinguishes between tethering/non-tethering modes of operation of the mobile devices. In the exemplary method summarized in FIG. 3, tethering is detected by a gateway component within the mobile wireless system 100 (e.g., the PDSN 114 or the home agent 120). If tethering is permitted for the mobile wireless device 102, then the access gateway establishes a mapping for subsequently tracking all data routed via the mobile wireless device 102 over a message flow with which the initially detected tethered packet is associated. The tracked data packets are monitored to update a total tethered data usage maintained in the accumulated tethered data usage field 162.

With continued reference to the exemplary method for detecting a message flow established by the mobile device 102 on behalf of a tethered device depicted in FIG. 3, during step 200 the access gateway component (PDSN 114 or HA 120) performs a deep packet inspection of a packet from the mobile device 102 to extract information indicative of the mobile device 102 operating in the tethering mode. Deep packet inspection involves looking within application/data (data payload) layer information within a communicated packet to determine whether the packet originated from the mobile device 102 or a tethered device such as the tablet computer 105b. One example of information, indicative of tethering mode operation of the mobile device 102, extracted by the access gateway component during the deep packet inspection is a user agent (UA) string that specifies a browser application ID. The browser ID for a browser application running on the mobile device 102 is given a specific value. Thus, if deep packet inspection, by the access gateway, of a received packet reveals that the UA string includes a value differing from the unique ID for the browser operating on the mobile device 102, the access gateway classifies the received packet as being for/from a tethered device. This is just one example of deep packet inspection used to detect tethering mode operation of the mobile device 102. Other ways of performing inspection of a packet to determine whether it is being transferred, via the mobile device 102, on behalf of a tethered device are contemplated for other exemplary tethering mode packet detection schemes.

Thereafter, at step 210, based upon data (user agent string providing a browser ID) obtained from the deep packet inspection procedure performed on a data packet passing between the mobile device 102 and the access gateway (e.g., PDSN 114) the system determines whether the mobile device 102 transferred the packet on behalf of a tethered device while operating in the tethering mode. If the access gateway determines that the packet originated from mobile device 102 (not from a tethered device), then control passes to step 220. During step 220 the access gateway passes the packet to the intended destination and, if necessary, notes that the packet originated from an application (e.g., browser) running on the mobile device 102—not from a tethered device. Any number of administrative actions can follow including noting the status and other information relevant to a later statistical analysis such as, for example, a time stamp, subscriber plan/status, etc. The tethering status (or the absence of such status) information can be used at a later time to determine overall usage patterns on an individual user basis or over a specified group of subscribers. The total monthly accumulated usage field 158 is updated and the tethered mode monthly accumulated usage field 162 is not changed.

On the other hand, during step 210, if the system determines that the mobile device 102 is transferring a data packet while operating in the tethering mode, then control passes to step 230. During step 230 the system accesses subscriber profile information relating to the mobile device 102 (e.g., the user/session profile provided by the AAA 116 during set up of the current session for the mobile device 102) to determine whether the mobile device 102's subscription permits use of the mobile device 102 in the tethering mode. Such subscriber information is maintained, for example, in a subscriber profile repository that is maintained centrally by the AAA 116. In an exemplary embodiment, whether the mobile device 102 can operate in the tethering mode is passed in a specified profile for an account with which the mobile device 102 is associated. The specified profile is provided, for example, by the AAA server 116 when the data session is initially set up between the mobile device 102 and the mobile wireless network 100. However, this information can be maintained within and provided from alternative locations.

If, at step 230, the access gateway of the mobile wireless network 100 determines. that the mobile device 102 is indeed permitted to pass a packet on behalf of a tethered device (i.e., operate in the tethering mode), then control passes to step 240. Such permission is determined for example, by accessing the information associated with a subscriber account discussed previously herein above with reference to FIG. 2. In particular, the values in tethered usage field 162 and tethered data limit field 164 are compared. If the value in limit field 164 exceeds the value in the usage field 162, then the mobile device 102 is deemed permitted to transfer the data packet on behalf of a tethered device. Alternatively, a tethering status is maintained that enables the access gateway to quickly determine the tethering permission for the mobile device 102 with a single data access.

The system described herein contemplates charging subscribers an appropriate fee for use of their devices in the aforementioned "tethering mode." Therefore, at step 240 the system, in particular the access gateway, tags the received data packet as a "tethering mode" packet and updates the value in the tethered accumulated usage field 162. Once the access gateway identifies a particular message flow initiated by a first detected "tethering mode" packet during step 210, the access gateway continues to monitor all packets (and total data) passing between the mobile device 102 and the mobile wireless network 100 relating to the particular message flow. Such monitoring is carried out using, for example, the aforementioned deep packet inspection on packets transferred between the mobile device 102 and the mobile wireless network 100. The total accumulated usage field 158 is updated accordingly.

At step 250, the access gateway (e.g., HA 120) provides information relating to the tethering mode data packet transmission to the billing and rating engine 124. Such information is, by way of example, accumulated by the HA 120 for a session (or any other desired level of granularity for accumulated counters of transmitted data packets), and upon termination of a session by the mobile device 102, information associated with the mobile device 102's operation in the tethering mode (e.g., accumulated total and tethered data usage stored in fields 158 and 162, respectively) is passed from the access gateway via the mobile network's administrative communications channels to the billing and rating engine 124.

Returning to step 230, if instead the access gateway (e.g., PDSN 114 or HA 120) determines that the mobile device 102 is not permitted to route data packets on behalf of other devices (i.e., operate in the tethering mode), then control passes to step 260. At step 260, the access gateway drops the received tethering mode packet to/from the mobile device 102 thereby ending the message flow at the initial request stage. Control then passes to step 270 wherein the access gateway initiates terminating the session within which the tethering mode packet was received by the mobile wireless network 100 from the mobile device 102. Next, at step 280, a message is sent to the subscriber associated with the mobile device 102 indicating that the mobile device 102 had been detected to be operating in a "tethering mode" and the session was terminated by the system due to limits on such operating mode to authorized subscribers. Such message, e.g., a text message or email, is issued in accordance with a script executed, for example, by the OSS 122.

Moreover, it is contemplated that the system will support an automated upgrading process wherein, prior to terminating a session, the system issues a message to the user of the mobile device 102 offering an upgrade to the current subscription that will permit the mobile device 102 to operate in the tethering mode. If the user accepts, then the profile information in the subscription for the mobile device 102 is modified to permit tethering (e.g., setting or re-setting the value stored in tethering usage limit field 164). The session for the mobile device 102 is terminated administratively. When the mobile device reestablishes a session on the mobile wireless network 100, the updated profile information is provided to the access gateway (e.g., HA 120 and PDSN 114) to enable packets to be routed by the mobile device 102 on behalf of tethered devices.

It is noted that once the system is capable of detecting tethering (and accumulating total quantity of data routed by the mobile device 102 operating in this mode) a variety of subscription/usage plans are contemplated for charging for such use including those previously discussed herein.

Figure 4:
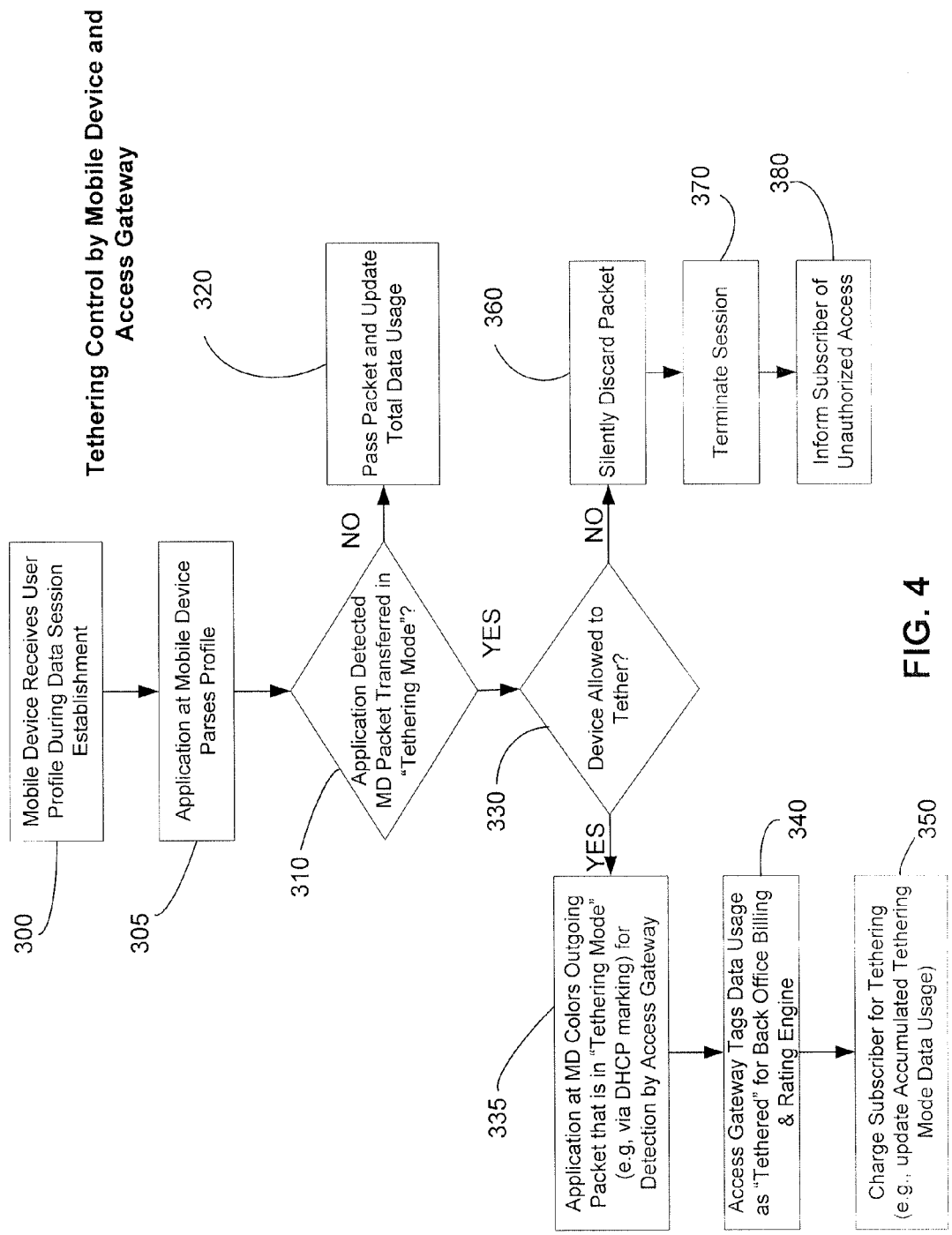
FIG. 4 is a schematic diagram illustrating a flow chart in accordance with another embodiment of the invention.

Turning to FIG. 4, a set of steps summarize another example of implementing the detection and handling of packets routed by the mobile device 102 on behalf of tethered devices. In the example summarized in FIG. 4, the mobile device 102 executes a tethering mode management program (e.g., an application, applet, plug-in, snap-in, etc.) that facilitates detecting and reporting of data packets routed by the mobile device 102 on behalf of a tethered device.

During step 300, the mobile device 102 receives a user profile from the AAA 116 in association with setting up a data session on the mobile wireless system 100. The received profile includes, among other things, permissions granted to the user session upon completion of the session setup. In an exemplary embodiment, one such permission specified within the profile is whether the mobile device is permitted to transfer data packets on behalf of tethered devices. In a particular example, the AAA server 116 provides tethering permission parameter information to both the HA and the PDSN when a session is established. The PDSN provides the tethering enablement parameter information to the mobile device 102. It is noted that steps 300 and 305 are performed once (when a session is set up) for a session of the mobile device 102. The remaining steps are performed on an as needed basis in response to reception of a new data packet associated with the mobile device 102.

Thereafter, during step 305, the tethering mode management program (e.g., application) operating on the mobile device 102 parses the received profile to determine whether, in fact, the mobile device 102 is permitted to operate in the tethering mode.

During step 310, the tethering mode management application running on the mobile device 102 determines whether a packet is being transferred by the mobile device 102 on behalf of a tethered device (e.g., whether the device is operating in a "bridging" mode in the case of a device running the ANDROID operating system). Such detection is facilitated, for example, by observing whether the source/destination of a packet is an application (e.g., browser) running on a tethered device (e.g., tethered tablet 105b)—as opposed to an application running on the mobile device 102. Other ways for the mobile device 102 to detect "tethering" mode of transferred packets are contemplated in alternative examples.

If the tethering mode management application detects, at step 310, that the packet originated from mobile device 102 (not from a tethered device), then control passes to step 320. During step 320 the packet is passed to an intended destination. Moreover, as noted above with reference to step 320, any number of administrative actions can follow including noting the status and other information relevant to a later statistical analysis such as, for example, a time stamp, subscriber plan/status, etc. The tethering status (or the absence of such status) information can be used at a later time to determine overall usage patterns on an individual user basis or over a specified group of subscribers. The total monthly accumulated usage field 158 is updated and the tethered mode monthly accumulated usage field 162 is not changed.

On the other hand, during step 310, if the tethering mode application running on the mobile device 102 determines that the mobile device 102 is transferring a data packet while operating in the tethering mode, then control passes to step 330. During step 330 the application on the mobile device 102 accesses subscriber profile information relating to the mobile device 102 (e.g., the user/session profile provided by the AAA 116 during set up of the current session for the mobile device 102) to determine whether the mobile device 102's subscription permits use of the mobile device 102 in the tethering mode.

If, at step 330, the application running on the mobile device 102 determines that the mobile device 102 is indeed permitted to pass a packet on behalf of a tethered device (i.e., operate in the tethering mode), then control passes to step 335. Such permission is determined for example, by accessing the information associated with a subscriber account discussed previously herein above with reference to FIG. 2. In particular, the values in tethered usage field 162 and tethered data limit field 164 are compared. If the value in limit field 164 exceeds the value in the usage field 162, then the mobile device 102 is deemed permitted to transfer the data packet on behalf of a tethered device. Alternatively, a tethering status is maintained in the profile, provided for the mobile device 102 during session set up, that enables the tethering mode management application on the mobile device 102 to quickly determine the tethering permission for the mobile device 102 with a single data access.

During step 335, the tethering mode management application on the mobile device 102 colors the outgoing packet (e.g., using DHCP marking in the IP header) with a value indicating to the access gateway (e.g., HA 120 or PDSN 114) that the packet is being transferred by the mobile device 102 on behalf of a tethered device. The coloring of the packet, in an exemplary embodiment where the access gateway tracks data usage in the tethering mode, enables the access gateway to identify subsequent downstream data responding to an initial request from the mobile device 102 on behalf of a tethered device. Alternatively, the tethering mode management application on the mobile device 102 keeps track of all data usage associated with the message flow resulting from a request from a tethered device (e.g., tethered tablet 105b.

As noted previously herein above, the system described herein contemplates charging subscribers an appropriate fee for use of their devices in the aforementioned "tethering mode." Therefore, at step 340 the system, in particular the access gateway, tags the received data packet as a "tethering mode" packet and updates the value in the tethered accumulated usage field 162. The total accumulated usage field 158 is also updated. At step 350, the access gateway (e.g., HA 120 or PDSN 114) provides information relating to the tethering mode data packet transmission to the billing and rating engine 124. Such information is, by way of example, accumulated by the access gateway for a session (or any other desired level of granularity for accumulated counters of transmitted data packets), and upon termination of a session by the mobile device 102, information associated with the mobile device 102's operation in the tethering mode (e.g., accumulated total and tethered data usage stored in fields 158 and 162, respectively) is passed from the access gateway via the mobile network's administrative communications channels to the billing and rating engine 124.

Returning to step 330, if instead the access gateway (e.g., PDSN 114 or HA 120) determines that the mobile device 102 is not permitted to route data packets on behalf of other devices (i.e., operate in the tethering mode), then control passes to step 360. At step 360, the access gateway drops the received tethering mode packet to/from the mobile device 102. Control then passes to step 370 wherein the access gateway initiates terminating the session within which the tethering mode packet was received. Next, at step 380, a message is sent to the subscriber associated with the mobile device 102 indicating that the mobile device 102 had been detected to be operating in a "tethering mode" and the session was terminated by the system due to limits on such operating mode to authorized subscribers. Such message, e.g., a text message or email, is issued in accordance with a script executed, for example, by the OSS 122.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for managing, by a mobile wireless data network access gateway on a packet-by-packet basis on an existing session, use of a mobile wireless device in a tethering configuration comprising:
   receiving, by the mobile wireless data network access gateway, a message packet issued from a device tethered to the mobile wireless device for forwarding on the existing session;
   inspecting, by the mobile wireless data network access gateway, information within the message packet from the group consisting of:
      application layer information, and
      data layer information; and
   conditionally discarding, by the mobile wireless data network access gateway, the message packet from the mobile wireless device based upon:
      determining, based on the inspecting, the message packet originated from a device tethered to the mobile wireless device, and
      determining the mobile wireless device is not permitted to pass message packets, on the existing session, on behalf of the device tethered to the mobile wireless device by referencing a profile with which the mobile device is associated.

2. The method of claim 1 wherein the mobile wireless data network access gateway is a home agent node.

3. The method of claim 1 wherein the mobile wireless data network access gateway is a packet data serving node.

4. The method of claim 3 wherein the information within the message packet indicates a user application that issued a request with which the message packet is associated.

5. The method of claim 1 wherein the information within the message packet indicates a user application that issued a request with which the message packet is associated.

6. The method of claim 1 wherein the determining the message packet originated from a device tethered to the mobile wireless device is carried out without coloring the message packet, prior to transmitting the message packet, by the mobile device to indicate that the message packet is being transmitted by the mobile wireless device on behalf of the device tethered to the mobile wireless device.

7. The method of claim 1 further comprising the steps of:
   further receiving a further message packet originating from a device tethered to the mobile wireless device for forwarding on the existing session;
   determining, by the mobile wireless data network access gateway in response to the further receiving step, whether the mobile wireless device is permitted to pass message packets, on the existing session, on behalf of tethered devices by referencing the profile with which the mobile device is associated;
   passing the further message packet in response to determining from the profile that the mobile wireless device is permitted to pass message packets on behalf of tethered devices; and
   updating a tethered mode data usage field maintained for a subscriber account, with which the mobile wireless device is associated, in accordance with the passing the further message packet.

8. The method of claim 7 further comprising charging the subscriber account a differentiated rate associated with permitted routing of message packets by the mobile device on behalf of tethered devices.

9. The method of claim 8 wherein the charging the subscriber account a differentiated rate comprises charging the account based upon:
   an accumulated data usage value stored in the tethered mode data usage field, the accumulated data usage value being updated only when a message packet is identified as being passed on behalf of a tethered device, and
   the differentiated rate.

10. A non-transitory computer readable medium including computer executable instructions for configuring a mobile wireless data network access gateway to manage, on a packet-by-packet basis on an existing session, use of a mobile wireless device in a tethering configuration, the computer executable instructions facilitating performing the steps of:
    receiving, by the mobile wireless network access gateway, a message packet issued from a device tethered to the mobile wireless device for forwarding on the existing session;
    inspecting, by the mobile wireless network access gateway, information within the message packet from the group consisting of:
       application layer information, and
       data layer information; and
    conditionally discarding, by the mobile wireless network access gateway, the message packet from the mobile wireless device based upon:
       determining, based on the inspecting, the message packet originated from a device tethered to the mobile wireless device, and
       determining the mobile wireless device is not permitted to pass message packets, on the existing session, on behalf of the device tethered to the mobile wireless device by referencing a profile with which the mobile device is associated.

11. The non-transitory computer readable medium of claim 10 wherein the mobile wireless data network access gateway is a home agent node.

12. The non-transitory computer readable medium of claim 10 wherein the mobile wireless data network access gateway is a packet data serving node.

13. The non-transitory computer readable medium of claim 12 wherein the information within the message packet indicates a user application that issued a request with which the message packet is associated.

14. The non-transitory computer readable medium of claim 10 wherein the information within the message packet indicates a user application that issued a request with which the message packet is associated.

15. The non-transitory computer readable medium of claim 1 wherein the determining the message packet originated from a device tethered to the mobile wireless device is carried out without
coloring the message packet, prior to transmitting the message packet, by the mobile device to indicate that the message packet is being transmitted by the mobile wireless device on behalf of the device tethered to the mobile wireless device.

16. The non-transitory computer readable medium of claim 10 further comprising computer executable instructions facilitating performing the steps of:
receiving a further message packet originating from a device tethered to the mobile wireless device for forwarding on the existing session;
determining, by the mobile wireless data network access gateway in response to the receiving step, whether the mobile wireless device is permitted to pass message packets, on the existing session, on behalf of tethered devices by referencing a profile with which the mobile device is associated;
passing the further message packet in response to determining from the profile that the mobile wireless device is permitted to pass message packets on behalf of tethered devices; and
updating a tethered mode data usage field maintained for a subscriber account, with which the mobile wireless device is associated, in accordance with the passing the further message packet.

17. The non-transitory computer readable medium of claim 16 further comprising computer executable instructions for charging the subscriber account a differentiated rate associated with permitted routing of message packets by the mobile device on behalf of tethered devices.

18. The non-transitory computer readable medium of claim 17 wherein the charging step comprises charging the subscriber account based upon an accumulated data usage value stored in the tethered mode data usage field and the differentiated rate.

19. A mobile wireless data network access gateway for managing, on a packet-by-packet basis on an existing session, use of mobile wireless devices in a tethering configuration, the access gateway comprising:
an access gateway configured, by computer executable instructions stored on a non-transitory computer-readable medium, to carry out the steps of:
receiving, by the mobile wireless network access gateway, a message packet issued from a device tethered to the mobile wireless device for forwarding on the existing session;
inspecting, by the mobile wireless network access gateway, information within the message packet from the group consisting of:
application layer information, and
data layer information; and
conditionally discarding, by the mobile wireless network access gateway, the message packet from the mobile wireless device based upon:
determining, based on the inspecting, the message packet originated from a device tethered to the mobile wireless device, and
determining the mobile wireless device is not permitted to pass message packets, on the existing session, on behalf of the device tethered to the mobile wireless device by referencing a profile with which the mobile device is associated.

* * * * *